May 21, 1935. O. OHNESORGE 2,002,126
FRICTION DRIVE
Original Filed April 8, 1929 4 Sheets-Sheet 1
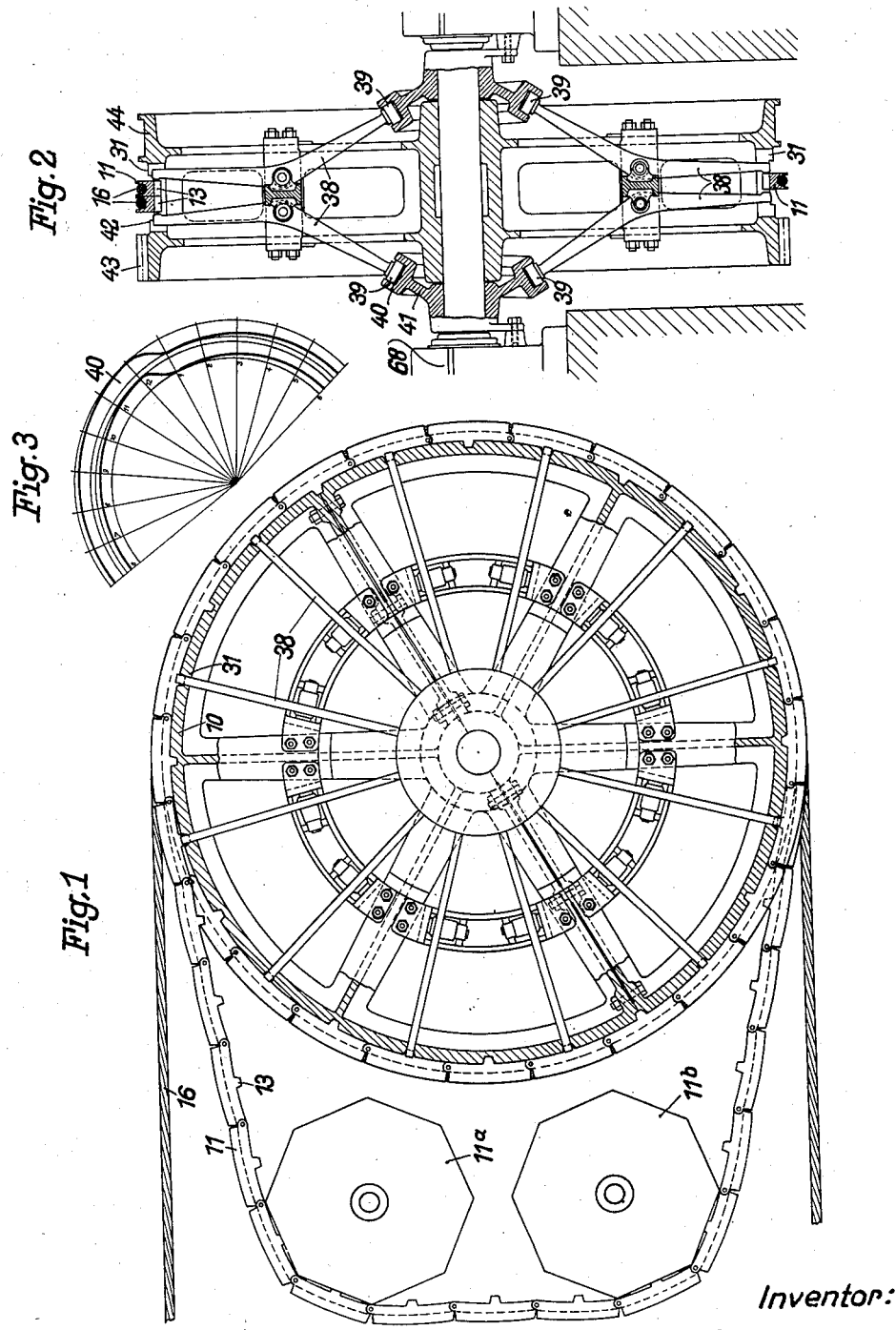
Inventor:
Otto Ohnesorge
By B. Singh
Atty.

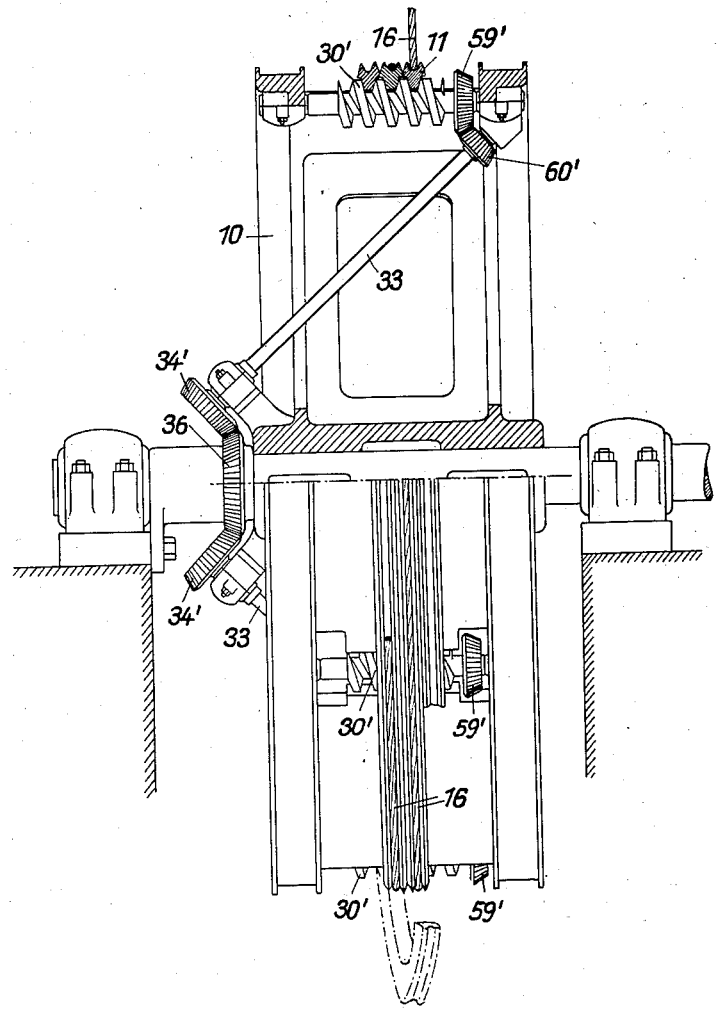

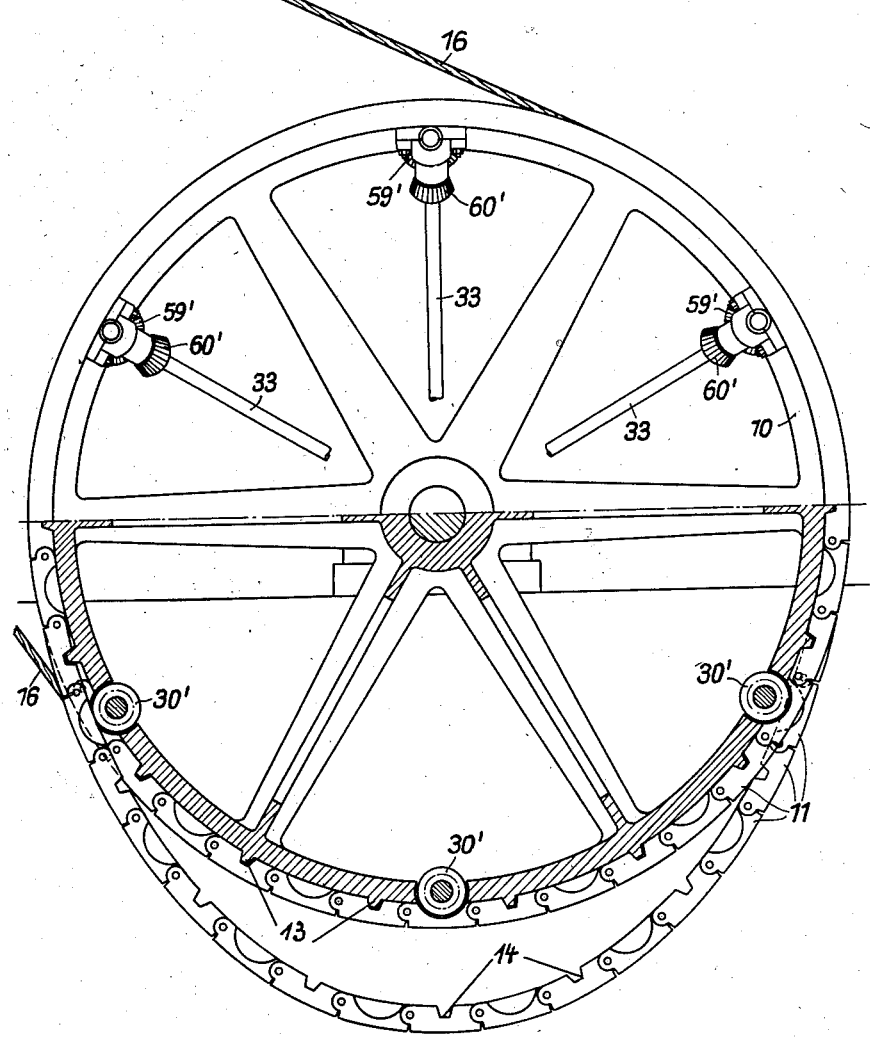

Patented May 21, 1935

2,002,126

UNITED STATES PATENT OFFICE 2,002,126

FRICTION DRIVE

Otto Ohnesorge, Bochum, Germany

Original application April 8, 1929, Serial No. 353,626. Divided and this application July 2, 1934, Serial No. 733,401. In Germany June 8, 1928

12 Claims. (Cl. 74—224)

This specification is a division of my application for Letters Patent of the United States for improvements in Friction drives, Serial No. 353,-626, filed April 8, 1929, under the provision of the International Convention.

Both in conveyor and in stationary motor plants it is in many instances necessary to increase the frictional cling or grip obtained by passing a rope, chain or similar pulling or tensile agency, mostly to the extent of one half but in some cases also three-fourths around, over the periphery of a driving pulley. If with the above object it is proposed to pass the rope etc. completely around the pulley or even to a greater extent, the said pulling agency (rope etc.) must be guided in a spiral winding around the driving pulley or drum.

The object of this invention is to provide an improved friction drive for the pulling cable which passes over the entire periphery or more of a pulley, by which, no matter whether a drive of alternating or uniform direction of rotation is in operation, a continuous persistence of the loop or bight of the pulling cable in the same central plane is ensured without disturbances taking place incident to displacement of the pulling agency relatively to the pulley.

With the above and other objects in view, the invention consists in the construction, combination and arrangement of devices hereinafter described and claimed.

In the accompanying drawings

Figure 1 is an elevation partly in section of a friction drive mechanism constructed and arranged in accordance with my invention.

Figure 2 is a transverse sectional view of the same.

Figure 3 is a detail elevation of a portion of the fixed element which actuates the shifting elements.

Figure 5 is a similar view of another modified form of the invention.

Figure 6 is an elevation partly in section of the form of the invention shown in Figure 5.

Figure 4:
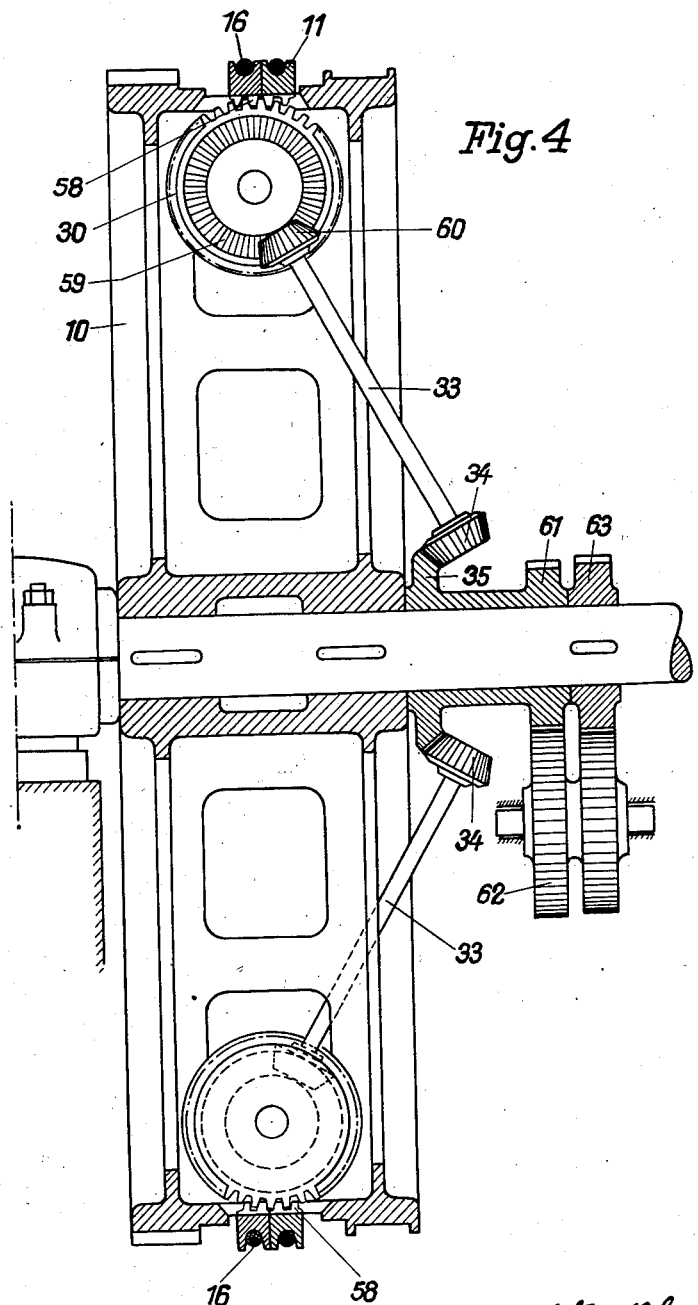
Figure 4 is a transverse sectional view of a modified form of the invention.

The frictional drum or pulley 10 is here shown as provided with transverse slots 31 in its crown and at one side of its periphery is provided with gear teeth 43 and the opposite side is here shown as circumferentially grooved as at 44 for engagement by a power transmitting belt.

An endless band or chain 11 is composed of a number of shoe links hingedly connected together and provided on their inner sides each with a tooth 13 which engage in transverse notches 31 with which the pulley is provided. The said band 11 has a portion thereof looped about the periphery of the pulley in several turns or convolutions and also engages idle pulleys 11ª, 11ᵇ. The endless cable 16 engages longitudinal grooves in the outer sides of the shoe links of the endless band as shown in Figure 2, so that the endless band is interposed between the cable and the periphery of the drum.

Mounted in the drum or pulley 10 are radially arranged crank levers 38 the heads of which are guided in the slots 31 of the crown of the drum and come into engagement with the carriers (catches) 13 of the shoes 11. These levers are the shifting elements to operate the shoe links of the band and are distributed around the entire circumference of the pulley or drum as shown. In order to loop the band a number of times around the driving pulley, it is necessary to carry out the transverse displacement thereof over the entire circumference of the pulley and not in a locally restricted place and that such shifting of the chain or band over the entire circumference of the pulley be carried out by elements or means which are supported on the pulley itself and which are therefore carried by and moved with the pulley when the latter moves. The levers 38 effect this.

The counter heads provided with rollers 39 run in a cam groove 40 lying on a corresponding conical casing, which groove is in a body 41 which is centered by the shaft of the drum 10 and is held against twist by the bearing 68. This groove 40 shown in developed form in Figure 3 forms a spiral stationary in space which effects a gradual displacement of the shoe chain 11 over the major portion of the periphery, while shortly in front of the particular point of entry of the length of chain the lifting off of the heads of the levers 38 from the chain of shoes takes place and then after they have been placed against the newly entered length of chain, the work of displacement is begun anew. In this manner the summing up of all inaccuracies, if any, is avoided. If the path described is too small then a slight friction would take place between the two lengths of the shoe chain coming to lie against each other, if it is too great then the second length would only place itself against the first somewhat later than corresponds to the theory. As this is quite harmless, it is advisable to so dimension the entire device from the outset that the particular transverse displacement by the shifter device is slightly greater from the outset than the width of the shoe.

In order to reduce the number of parts which is of particular importance in reversing drives only each second shoe 11 is actuated each time by the levers 38, this being done in its center, so that the shoe lying between is carried along by the two others. As is evident this is perfectly permissible because this still provides with certainty for the several shoes to be carried over the entire periphery. Only at the particular point of entry of the chain of shoes, where the lifting off of the levers from the shoes 11 takes place, will the chain then be free over some length. In order, however, to limit suitably the free lengths, lateral limits 42 are suitably provided on the periphery of the drum, which each time take up at this point temporarily the duty of the displacing levers.

If this arrangement is used for a reversing drive then a certain disagreement would thereby result between forward run and backward run, because these two would now not exactly coincide. This can, however, be obviated, as illustrated in Figure 2 by providing a certain amount of play between the shifter device for forward running and that for backward running. This play or backlash (slop) will, in the present case, not result in an impact or blow because it only permits a slight lateral travel of the chain of shoes and the loop of rope before the shifter device comes into action. By permitting this entirely harmless lateral travel the jammings which would result from the above mentioned disagreements as in all so-called mechanisms in an over-rigidly closed circle are obviated.

This form of the invention, in addition to the advantageous features in principle described above, shows a further advantage because the driving crown 43 and the brake crown 44 can now directly connect with the friction drum 10 as is the case with wire rope haulage or tramlines above all in mines. If the rollers 39 are themselves made to run on roller bearings, then the frictional work will even be reduced much further.

The same idea may also be carried into effect by a continuously operating shifter gear as illustrated in cross-section in Figure 4. The shoes 11 which run onto the driving pulley 10 and form the groove for the rope 16 have teeth 58 of a pitch proportional to the distance between the adjoining lengths of pulling rope in the ratio of 1 to 1, 1 to 2 etc., in which the crown wheel 30 arranged with a certain pitch in the drum engages. By the aid of pairs of bevel wheels 59, 60, and shafts 33, the spur wheels 30 are engaged with the bevel wheel pairs 34, 35, of which 35 is a central wheel revolving loosely on the shaft. This latter wheel again by its toothed crown 61 is in engagement with the gear wheel 62 mounted stationary, the second toothed rim of which meshes with the central pinion 63 fixed on the shaft. Owing to the difference between the ratios of these spur wheel bearings a differential gear is produced by which on rotation of the pulley 10 the shoes 11 are each time shifted by one width. In this way, therefore, for both directions of revolution, a constant displacement of the chain of shoes as it runs on is provided so that the groove for the rope 16 represents an accurate spiral always lying in the same central plane.

A particularly efficient constructional form of this idea is shown in Figures 5 and 6 in vertical section and elevation. Here the pulley 10 has on its periphery divided displacing (shifting) worms 30' which are driven by pairs of bevel pinions 59', 60', shafts 33, bevel pinions 34', from the fixed central wheel 36. As here again the teeth projecting beyond the sectional profile of the chain shoes 11 in the first place will unfavorably increase the height of the shoes, so that the free sag for the chain loop would have to be increased and on the other hand would provide the possibility of entanglement, the teeth are as illustrated in Figures 5 and 6, shifted into the interior of the sectional profile. In this case there corresponds to the one direction of winding on of the chain (right hand winding on) the one direction of feed of the displacer device, and to the other direction of winding on (left hand winding) the other direction of feed of the displacer device.

The loop of chain shoes is in this case guided according to Figure 6 so that in the event of a pulley or drum hoist for shafts, with lengths of rope 16 running obliquely to the pulley on the hoisting framework, the chain of shoes is on the one side of the point where the rope runs off run free (empty) for about one-third of the periphery, and on the other side for about two-thirds of the periphery in order to permit of free crossing by the pass-over loop, with corresponding sag over the lengths of chain lying on the lower half of the driving pulley 10. It may here be expressly pointed out that by this additional winding of the chain of shoes round the pulley the work of transverse shift is practically not increased, because the free lengths of chain are not under the load of the rope tension.

If this new drive is compared with previous pulley drives or rope haulage, in which the rope only surrounds half the periphery of the pulley, then the following is evident: while maintaining all advantages of pulley haulage especially as regards the fact that the rope remains constantly lying in the same central plane and with only one curve (bend) of the rope, an increase of the encirclement of the pulley to three times the amount is secured whereby all imaginable requirements of actual operation for increase of the frictional grip are more than amply provided for.

Having thus described my invention, what I claim is:

1. In combination with a pulley and a cable having a portion thereof looped about the periphery of the pulley, an endless band loosely wrapped around the periphery of the pulley between the same and the cable and on the outer side of which the cable engages, and displacing elements comprising levers carried by and mounted on the pulley and at their outer ends engaging a plurality of the links of said band; a fixed element having a helical groove forming a cam engaged by the inner ends of said levers and by which said levers are controlled, said helical groove including an S-curve active to cause the levers at each revolution of the pulley to return toward the part of the endless band which is in engaging relation with the pulley, so that the transverse displacement proceeds always from the same neutral point.

2. In combination with a pulley and a cable having a portion thereof looped about the periphery of the pulley, an endless band loosely wrapped around the periphery of the pulley between the same and the cable and comprising shoe links flexibly connected together and on the outer side of which the cable engages, and means for uniformly laterally displacing the shoe links on the pulley to the extent of the width of a shoe link for each revolution of the pulley and comprising levers carried by and mounted on the pulley and distributed around the circumference thereof, and means to actuate said levers.

3. Apparatus as claimed in claim 2, in which the means to actuate the shifting levers is a fixed cam.

4. In combination with a pulley and a cable having a portion thereof looped about the periphery of the pulley, an endless band loosely wrapped around the periphery of the pulley between the same and the cable and on the outer side of which the cable engages, displacing elements comprising levers carried by and mounted on the pulley and at their outer ends engaging a plurality of the links of said band, and a fixed element having a helical groove forming a cam engaged by the inner ends of said levers and by which said levers are operated.

5. Apparatus as claimed in claim 4, in which the outer ends of the levers bear against the endless band and shift the same gradually a distance corresponding to the width thereof.

6. Apparatus as claimed in claim 2, in which there are two groups of the shifting levers, one arranged for operation in one direction of rotation of the pulley and the other arranged for operation in the reverse direction of such rotation and in which separate means are provided for actuating said groups of levers.

7. Apparatus as claimed in claim 2, in which there are two groups of the shifting levers, one arranged for operation in one direction of rotation of the pulley and the other arranged for operation in the reverse direction of such rotation and in which separate means are provided for actuating said groups of levers and in which the two groups of shifting levers are so spaced apart as to provide play for the endless band to avoid jamming when the rotation of the pulley is reversed.

8. Friction drive for ropes, chains and similar pulling means, consisting of a drum, an endless band of chain links laid around said drum in several convolutions, said chain links having a groove at their circumference for receiving the pulling means, so that it also surrounds the drum in more than one convolution, and shifting elements by which the chain windings are gradually shifted for the width of the chain during each revolution, said shifting elements being mounted in the drum, and control elements by which the operation of the shifting elements is effected, said control elements being fixedly arranged near the shaft of the drum.

9. Friction drive for ropes, chains or similar pulling means as claimed in claim 8, in which the shifting elements are so provided that only every second chain link is directly shifted by the shifting elements.

10. Friction drive for ropes, chains and similar pulling means as claimed in claim 8, in which the point of attack of the shifting element is in the middle of the chain link, so that the intermediate links are indirectly taken along.

11. Friction drive for ropes, chains or similar pulling means as claimed in claim 8, in which the lateral shifting of the chain windings is effected by shifting levers mounted in the drum and controlled by a control member stationarily arranged near the shaft of the drum, the inwardly directed ends of said levers provided with rolls engaging a helical groove in the control member, said groove being continuous in itself by an S-connection, so that the shifting levers after each revolution of the driving disc begin anew from the starting point of the groove to laterally shift the chain windings.

12. Friction drive for ropes, chains or similar pulling means as claimed in claim 8, in which two groups of shifting levers are arranged within the drum, one of said groups acting in one direction of rotation and the other group acting in the opposite direction of rotation, and a control member is provided for each of said groups of shifting levers.

OTTO OHNESORGE.